US012551001B2

(12) United States Patent
Cheung et al.

(10) Patent No.: US 12,551,001 B2
(45) Date of Patent: Feb. 17, 2026

(54) CONVERTIBLE CARRYING CASE

(71) Applicant: Bright Fast International Limited, Kowloon (HK)

(72) Inventors: Paul Kwong Shun Cheung, Hong Kong (HK); Dingyu Guo, Calgary (CA); Matthew Edward Bevis, Vancouver (CA)

(73) Assignee: Bright Fast International Limited, Kowloon (HK)

( * ) Notice: Subject to any disclaimer, the term of this patent is extended or adjusted under 35 U.S.C. 154(b) by 181 days.

(21) Appl. No.: 18/528,642

(22) Filed: Dec. 4, 2023

(65) Prior Publication Data

US 2024/0180319 A1 Jun. 6, 2024

Related U.S. Application Data

(60) Provisional application No. 63/430,907, filed on Dec. 7, 2022.

(30) Foreign Application Priority Data

Dec. 6, 2022 (CA) ................................ CA 3183539

(51) Int. Cl.
*A45F 4/02* (2006.01)
*F16M 13/04* (2006.01)

(52) U.S. Cl.
CPC .......... *A45F 4/02* (2013.01); *A45F 2004/023* (2013.01); *F16M 13/04* (2013.01)

(58) Field of Classification Search
CPC .... A45F 2004/023; A45F 4/02; A45F 5/1525; F16M 13/04

(Continued)

(56) References Cited

U.S. PATENT DOCUMENTS 4,323,180 A 4/1982 Sloop
5,762,250 A 6/1998 Carlton et al.
(Continued)

FOREIGN PATENT DOCUMENTS

CN 2023233174846 6/2024
DE 10320619 B3 * 8/2004 ............ G01D 11/24
(Continued)

OTHER PUBLICATIONS

English translation of DE 10320619-B3 (Year: 2004).*
U.S. Appl. No. 63/430,907, filed Dec. 7, 2022, titled "Convertible Carrying Case", 29 pages.

*Primary Examiner* — Scott T McNurlen
(74) *Attorney, Agent, or Firm* — Wells St. John P.S.

(57) ABSTRACT

A convertible carrying case has a carrying strap, a first end of the strap is attached to the case housing near the top panel and the second end of the strap is slidably attached to an L-shaped guide member, the L-shaped guide member positioned at the periphery of the rear panel of the carrying case and adjacent the bottom panel and one side panel of the carrying case. The second end of the strap freely moves along the L-shaped guide member as the user manipulates the case between a rear carrying configuration, where the case is worn on the user's back, and a productivity configuration, where the case is supported against the abdomen of the user and the rear panel of the case is oriented upwardly, providing access through a flap on the rear panel to a laptop computer or other electronic device.

18 Claims, 9 Drawing Sheets

(58) Field of Classification Search
USPC .................................................. 224/578–582
See application file for complete search history.

(56) References Cited

U.S. PATENT DOCUMENTS

| | | | | |
|---|---|---|---|---|
| 5,887,777 | A * | 3/1999 | Myles ................... | G06F 3/0481<br>190/102 |
| 5,908,147 | A | 6/1999 | Chuang | |
| 6,793,112 | B2 * | 9/2004 | Ammerman .............. | A45F 3/02<br>224/264 |
| 11,937,686 | B2 * | 3/2024 | Bevis ...................... | A45F 3/047 |
| 2004/0089687 | A1 | 5/2004 | Ammerman | |
| 2012/0152417 | A1 * | 6/2012 | Thomas ................... | A45C 3/06<br>150/110 |
| 2015/0208789 | A1 | 7/2015 | Pylkovas | |
| 2015/0208790 | A1 * | 7/2015 | Pylkovas .................. | A45F 3/02<br>224/578 |
| 2018/0110310 | A1 * | 4/2018 | Chang .................. | A45C 13/185 |
| 2022/0160114 | A2 | 5/2022 | Bevis | |

FOREIGN PATENT DOCUMENTS

| | | |
|---|---|---|
| EP | 23275169 | 5/2024 |
| WO | WO 2004/099797 | 11/2004 |
| WO | WO 2009/090343 | 7/2009 |

* cited by examiner

CONVERTIBLE CARRYING CASE

REFERENCE TO RELATED APPLICATIONS

This application claims priority to Canadian patent application no. 3,183,539 filed on Dec. 6, 2022 and the benefit of U.S. Provisional patent application No. 63/430,907 filed on Dec. 7, 2022, both of which are incorporated herein by reference in their entirety.

FIELD

Cases, such as backpacks and laptop bags, for carrying items including laptops and tablets; in particular, such cases which may be carried or worn in different positions on the user.

BACKGROUND

Carrying cases are used for carrying items, including laptops and tablets. For example, students use backpacks or laptop bags to carry their laptops, tablets and books to and from school, while office workers similarly use backpacks or laptop bags to carry similar items to and from the office. Field workers use backpacks, laptop bags or similar cases to transport laptops and other types of equipment to the field to perform various tasks. When the mode of transportation includes public transportation, students and workers often try to get work done while in transit, though this is often difficult to accomplish due to the lack of a table top or other surface to set up the laptop or other devices. On public transit, students and workers may not have a seat available, in which case the student or worker must stand on the bus or train, making the task of working on a laptop or tablet yet more difficult to accomplish.

Applicant is aware of carrying cases which are convertible into a work platform for working on a notebook computer. For example, U.S. Pat. No. 5,762,250 to Carlton describes a convertible carrying case and work platform for small electronic devices such as laptop computers. The carrying case has a flexible top cover portion capable of forming a rolled portion that elevates the case structure when the case is supported in the user's lap, and is used when the user is sitting. A strap arrangement for the case permits the user to support the case over the shoulder to transport the device, or to position the case in a horizontal position in front of, and against, the user's abdomen, with straps going over both shoulders and underneath both arms of the user.

U.S. Pat. No. 5,908,147 to Chuang describes a carrying bag for a notebook computer and peripherals. The case is rectangular and provided with a cover having one side connected to the case and three sides sealably connected to the case by a zipper. The rectangular case has a rigid frame, a pair of supporting straps connected between the rectangular case and the cover, and a rigid board dimensioned to fit on top of the rigid frame. The rigid frame fits into the cover during transport, and may be moved to sit on top of the rigid frame, thereby providing a surface on which the notebook computer may be supported during use of the notebook computer.

Additional carrying cases for laptop or notebook computers are disclosed in International Patent publication no. WO/2009/090343, United States Patent Publication No. 2015/0208789 and United States Patent Publication No. 2015/0208790.

In U.S. Pat. No. 4,323,180 to Sloop, a camera shoulder case is described as providing easy access to one layer of securely held equipment in the case while the case remains supported by a shoulder strap on the user. A flexible loop member, mounted to the cover of the case, slidably receives the shoulder strap. The cover of the case pivots upwardly, towards the user, in order to access equipment inside the case.

United States Patent Publication No. 2022/0160114 to Bevis discloses a carrying case with a guide member extending along the bottom of the housing. A carrying strap has a first end connected to the case near the top of the housing, and the second end of the carrying strap is coupled to, so as to be movable along, the guide member, allowing the case to be moved into different positions.

United States Patent Publication No. 2004/0089687 to Ammerman discloses a backpack having one shoulder strap, with the first end of the shoulder strap attached to the upper portion of the backpack and the second end of the shoulder strap slidingly attached to an anchor extending along the bottom portion of the backpack. This arrangement allows the backpack to have only one shoulder strap, and yet allow the backpack to be worn with the shoulder strap on either the left or right shoulder.

SUMMARY

A convertible carrying case is provided which may be easily moved from a carrying position on a user's back, to a productivity position with the case resting against the user's abdomen, by using one hand to grasp and pull the carrying case between these two positions. Advantageously, the convertible carrying case may be used to provide a surface for supporting a laptop computer, tablet, or similar electronic device, and simultaneously allow the user to easily access the electronic device from where it is stored inside the cavity of the carrying case. Providing for one-handed manipulation of the case between its different carrying positions allows a user to access and use their electronic device from a standing or sitting position, which may be particularly advantageous when the user is on transit, standing in line, or otherwise spending time in an area where no seating is available. The carrying case may also be useful to students or workers who need to use a computing device or other electronic device while standing or moving, as may occur in a laboratory, on a recreational field or while conducting field work in a variety of industries.

In one aspect, the carrying case includes a housing, the housing having front and rear panels, top and bottom panels, and two side panels extending between the front and rear panels. The carrying case also includes a carrying strap, with one end of the carrying strap secured to the housing near the top panel, and the opposite end of the carrying strap coupled to, so as to freely move along, a guide. The guide has a first portion extending along the rear panel and adjacent to the bottom panel, and a second portion extending along the rear panel and adjacent to one of the two side panels. When the carrying case is carried on the user's back, the strap is worn over one shoulder and across the front of the user's body, and the second end of the strap is positioned along the first portion of the guide, to position the second end of the strap adjacent one of the side panels and spaced apart from the bottom panel of the carrying case. This may provide for an improved ergonomic rear carrying configuration, by lowering the center of gravity of the carrying case relative to the user's own center of gravity.

When the user desires to access or use an electronic device stowed within the carrying case, the user may grasp the carrying case in one hand to swing it under the user's shoulder and to the front of the user's body, during which the second end of the strap moves along the guide to the second portion of the guide, so that the strap is positioned adjacent the bottom panel of the carrying case. In this configuration, one of the side panels is supported against the user's abdomen and the rear panel, facing upwards, becomes a productivity surface on which a laptop computer, or other electronic device, may be used.

In one aspect of the present disclosure, a convertible carrying case is provided. The convertible carrying case comprises: a housing comprising a front panel, a rear panel, a top panel, a bottom panel and two side panels extending between the front and rear panels, and a carrying strap having first and second ends, wherein the first end of the carrying strap is attached to the housing adjacent the top panel and the second end is movably coupled to a guide. The guide is attached to the rear panel and comprising first and second ends and a body extending therebetween, the first end of the guide located adjacent the bottom panel and spaced apart from the two side panels, and the second end of the guide located adjacent to one of the two side panels and spaced apart from the bottom panel. The second end of the carrying strap moves freely along the body of the guide between the first and second ends of the guide when a user is manipulating the carrying case into different configurations. When the carrying case is in a rear carrying configuration, the second end of the carrying strap is positioned at the second end of the guide, adjacent to one of the two side panels and spaced apart from the bottom panel to provide an ergonomic rear carrying configuration by lowering a center of gravity of the carrying case relative to a center of gravity of the user of the carrying case. When the carrying case is in a productivity configuration, the second end of the carrying strap is positioned at the first end of the guide, adjacent to the bottom panel and spaced apart from the two side panels, and one of the side panels is resting against or proximate to the user so as to configure the rear panel as a working surface.

In some embodiments, the guide is an L-shaped guide, the body of the L-shaped guide having a first portion extending along the rear panel and adjacent to the bottom panel and a second portion extending along the rear panel and adjacent to one of the two side panels. The L-shaped guide may be a rigid rod, wherein the second end of the carrying strap includes a closed loop that encircles, so as to slide along, the rigid rod. In some embodiments, the L-shaped guide is a rigid channel and a ball-shaped joint or a t-shaped pin is attached to the second end of the carrying strap and retained within the rigid channel to move freely along the rigid channel. The rear panel may be a rigid or semi-rigid panel having an exterior surface, wherein the rigid channel is recessed within the rear panel beneath the exterior surface of the rear panel. In some embodiments, an angle between the first and second portions of the guide is greater than 90° and less than or equal to 97°.

In some embodiments, the guide comprises a flexible strap and at least one support extending orthogonally from the rear panel of the carrying case, the at least one support coupled to the flexible strap proximate a junction between the bottom panel and one of the two side panels to support the flexible strap in an approximate L-shape. The at least one support may be a split ring and the second end of the carrying strap may be coupled to the flexible strap of the guide via a sleeve, the sleeve encircling the flexible strap so as to slide along the flexible strap and pass through a gap of the split ring as the sleeve passes between the first and second portions of the guide.

In some embodiments, when the carrying case is in the productivity configuration, the working surface includes a screen flap having a hinge, the hinge located at an edge of the working surface that is distal from and approximately parallel to the user when the convertible carrying case is worn in the productivity configuration on the user. The screen flap may include an exterior surface and an interior surface, and a screen coupling may be attached to the interior surface of the screen flap for releasably coupling a screen of a computing device to the screen flap. In some embodiments, a keyboard surface is located in a cavity of the carrying case housing, the keyboard surface positioned between and approximately parallel to the front and rear panels of the carrying case housing, and wherein a keyboard of a computing device is supported on the keyboard surface and is accessible by the user when the screen flap is open and the carrying case is in the productivity configuration. In some embodiments, at least one of the screen flap and the keyboard surface are rigid or semi-rigid.

In some embodiments, the carrying case further includes a secondary strap, the secondary strap having a first end attached to the housing adjacent the top panel and a second end attached to the housing adjacent the bottom panel, wherein the carrying strap and the secondary strap are worn on opposite shoulders of the user when the carrying case is in the rear carrying configuration.

In some embodiments, the carrying case further includes at least one handle, the at least one handle attached to one of the two side panels, wherein the handle is graspable by the user with one hand for manipulating the carrying case between the rear carrying and productivity configurations. In some embodiments, the carrying case includes at least one port extending through the housing, the at least one port positioned to receive a connector of a cable, the cable selected from a group comprising: a power cable, a data cable.

In some embodiments, the guide comprises a flexible loop, the flexible loop slidably attached to at least two supports, the at least two supports extending orthogonally from the rear panel of the carrying case. The at least two supports support the first and second ends of the guide and a fixed strap connector coupled to the second end of the carrying strap is affixed to the flexible loop. As the flexible loop slides through the at least two supports, the fixed strap connector and the second end of the carrying strap freely move between the first and second ends of the guide. In some embodiments, each support of the at least two supports comprises a rigid member and each rigid member encircles the flexible loop. In some embodiments, the at least two supports comprises a first support, a second support and a third support. The first support extends from the rear panel at the first position, the second support extends from the rear panel at the second position, and the third support extends from the rear panel adjacent a junction between the bottom panel and one of the two side panels.

DETAILED DESCRIPTION

Figure 1:
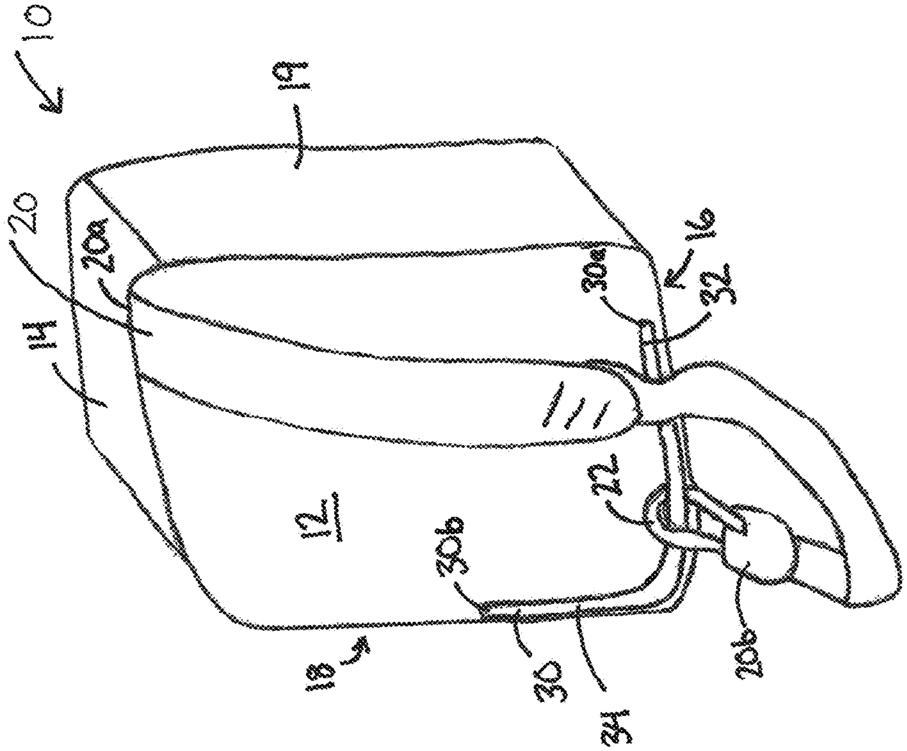
FIG. 1 is a rear perspective view of an embodiment of the carrying case in accordance with the present disclosure.

Referring to FIG. 1, an embodiment of the laptop carrying case 10 features a housing, the housing including a rear panel 12, a top panel 14, a bottom panel 16 (not shown in FIG. 1), and two opposite side panels 18, 19 extending between the front and rear panels and extending between the top and bottom panels. The carrying case further includes at least one carrying strap 20. A first end 20*a* of the carrying strap 20 is secured to the carrying case adjacent the top panel 14. The second end 20*b* of the carrying strap 20 is slidingly or movably coupled to the guide 30. The guide 30 is attached to, or integrated into, the rear panel 12 of the carrying case and includes a first portion 32 that extends along the rear panel 12 and adjacent to the bottom panel 16, and a second portion 34 of the guide 30 extends along the rear panel 12 and adjacent to one of the side panels 18, 19.

In the embodiment shown in FIG. 1, the guide 30 may be an L-shaped guide with the first and second portions 32, 34 being approximately perpendicular to each other. The guide 30 may typically be positioned at the periphery of the rear panel 12, and the second end 20*b* of the carrying strap 20 is configured to slide or move along the guide 30, so that the second end 20*b* may be affixed to, or positioned at, different locations on the rear panel 12 when the carrying case is moved into different configurations.

As will be appreciated, and as further discussed below, the guide 30 may be constructed in different ways in order to allow the carrying strap to move freely along the guide 30, as will be known to a person skilled in the art. In some embodiments, the guide 30 may be substantially L-shaped, such that the first and second portions 32, 34 of the guide 30 are approximately perpendicular to one another, although the exact shape and configuration of the guide 30 may vary. For example, as shown in FIGS. 2A to 2C, the guide 30 is made up of first and second portions 32, 34, with the first portion 32 running along the rear panel 12 and adjacent to the bottom panel 16, and the second portion 34 running along the rear panel 12 and adjacent to either one of the side panels 18, 19 of the carrying case housing.

Figure 2B:
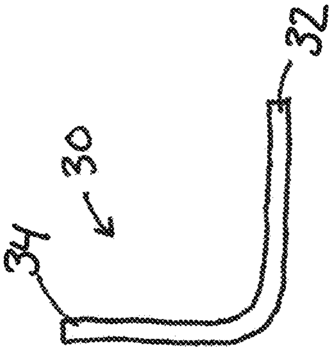
FIGS. 2A to 2C are plan views of embodiments of the guide for the carrying case disclosed herein.
Figure 2A:
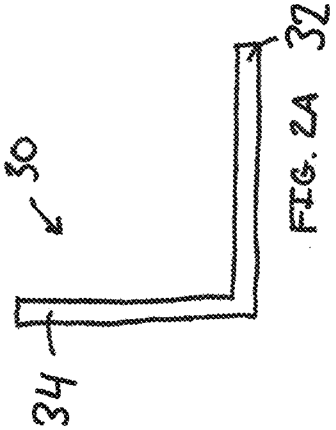
Figure 2C:
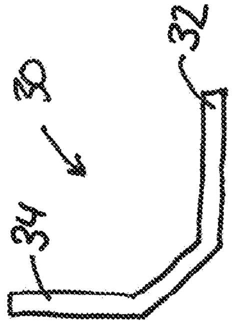

Although the shape of the guides 30 shown in the embodiments of FIGS. 2A to 2C are substantially L-shaped, it will be appreciated that the first and second portions of the guide may not be exactly perpendicular, or in other words, the first and second portions 32, 34 may not form a 90° angle relative to one another. For example, if the rear panel 12 of the carrying case had a shape other than a rectangular shape, the first and second portions of the guide 30 may not be perpendicular to each other if they are positioned at the periphery of a non-rectangular rear panel 12 so that the first portion is adjacent the bottom panel of the carrying case and the second portion is adjacent the side panel of the carrying case.

In a preferred embodiment, the angle α between the first and second portions 32, 34 of the guide 30 is slightly greater than 90° and the junction 38 between the first and second portions 32, 34 is preferably curved. The Applicant finds that a guide 30 having a curved junction 38 between the first and second portions 32, 34 of the guide 30 may allow the second end 20*a* of the carrying strap 20 to smoothly slide between the first and second portions 32, 34 of the guide 30. Providing a slightly obtuse angle α between the first and second portions 32, 34 of the guide 30 may allow the second end 20*a* of the carrying strap 20 to move more easily between the first and second ends 30*a*, 30*b* of the guide 30 as the carrying case 10 is moved between the rear carrying configuration and the productivity configuration, as will be further described below. When the terms "substantially perpendicular" or "approximately perpendicular" are used throughout this application, such terms refer to the arrangement of the first and second portions being positioned relative to one another such that the first portion 32 of the guide 30 is adjacent to the bottom panel 16 of the carrying case 10, and the second portion 34 of the guide 30 is adjacent to one of the side panels 18, 19 of the carrying case 10, even if such arrangement results in a guide 30 where the first and second portions 32, 34 are somewhat less than or greater than 90° with respect to one another. For example, without intending to be limiting, in some embodiments the first portion 32 of the guide 30 may not be parallel to the edge between the rear panel 12 and the bottom panel 16; such as, the first portion 32 may be positioned at an angle θ in the range between zero to two degrees, relative to the edge between the bottom panel 16 and rear panel 12; and the second portion 34 may be positioned at an angle β in the range of three to five degrees, relative to the edge between the side panel 18 and the rear panel 12.

As mentioned, there are different ways of constructing the guide 30 as would be known to a person skilled in the art. Any such constructions of the guide 30 are included in the scope of the present disclosure, so long as the guide 30 allows the second end 20*b* of the carrying strap 22 to move freely along the guide between a first position 62 on the rear panel 12, located proximate the bottom panel 16 and at a position between the side panels 18, 19; and a second position 64 on the rear panel 12, located proximate one of the side panels 18, 19 and spaced apart from the bottom panel 16. In some embodiments of the guide 30, such as shown in FIGS. 3A to 5A, moving the second end 20*b* of the strap 20 involves sliding the second end 20*b* of the strap from a first end 30*a* of the guide 30, along the first and second portions 32, 34 of the guide 30, to arrive at the second end 30*b* of the L-shaped guide 30. As will be further described below, the guide 30 may not necessarily be L-shaped, so long as the second end 20*b* of the strap 20 is able to move along a guide between the first and second positions 62, 64 on the rear panel 12 of the carrying case. Some illustrative examples for constructing a guide 30, not intended to be limiting, are described below.

Figure 3A:
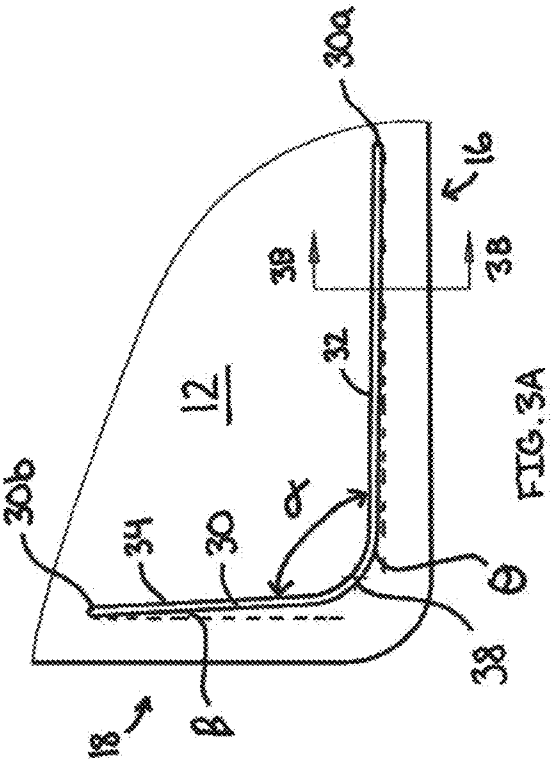
FIG. 3A is a close-up view of an embodiment of a guide of the carrying case.
Figure 3B:
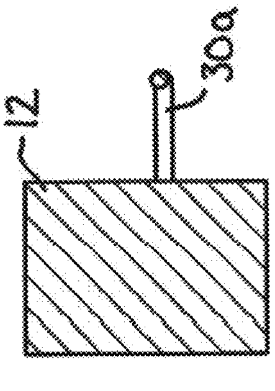
FIG. 3B is a cross-sectional view of the embodiment of the carrying case shown in FIG. 3A, taken along line 3B-3B of FIG. 3A.

In a preferred embodiment illustrated in FIGS. 3A and 3B, the guide 30 is a rigid or semi-rigid rod, with a first end 30*a* and a second end 30*b* each secured to the rear panel 12 of the carrying case. The second end 20*b* of the carrying strap 20 is provided with a loop 22 (shown in FIG. 1) that encircles the rigid or semi-rigid guide 30. Thus, the second end 20*b* of the carrying strap 20 freely moves along the guide 30 from a first end 30*a* to a second end 30*b*.

Figure 4A:
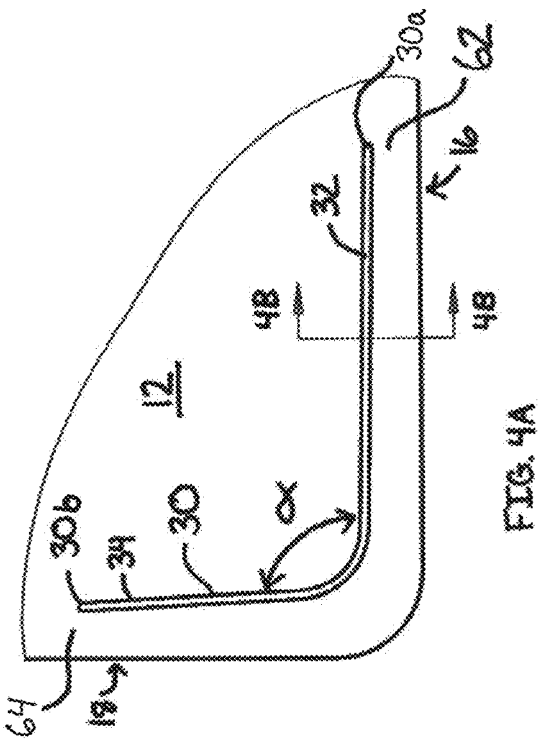
FIG. 4A is a close-up view of an embodiment of a guide of the carrying case.
Figure 4B:
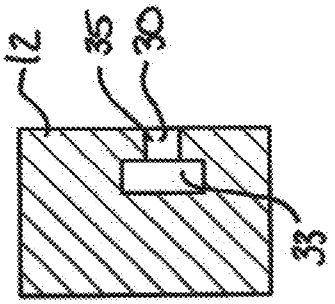
FIG. 4B is a cross-sectional view of the embodiment of the carrying case shown in FIG. 4A, taken along line 4B-4B of FIG. 4A.

In other embodiments, such as shown in FIGS. 4A and 4B, the guide 30 may be a channel or a track, which is recessed from the surface of the rear panel 12. In such embodiments, the rear panel 12 may be rigid or semi-rigid and the channel 30 may be integrally formed with the rear panel 12. In other embodiments, the channel 30 is rigid or semi-rigid and the surrounding rear panel 12 is secured to, so as to extend from, the edges of the channel 30. In such embodiments, where the guide 30 is constructed as a rigid or semi-rigid channel, the second end 20*b* of the carrying strap 20 may be provided with a T-shaped joint or a ball joint (not shown), which is retained within the track portion 33 of the channel 30. A narrow slot 35 allows a swivel connector of the joint (not shown) to extend outwardly of the channel 30, and the swivel connector is attached to the second end 20*b* of the carrying strap 20. In such embodiments, the joint moves freely along the track portion 33 of the channel while being retained within the channel 30.

Figure 5A:
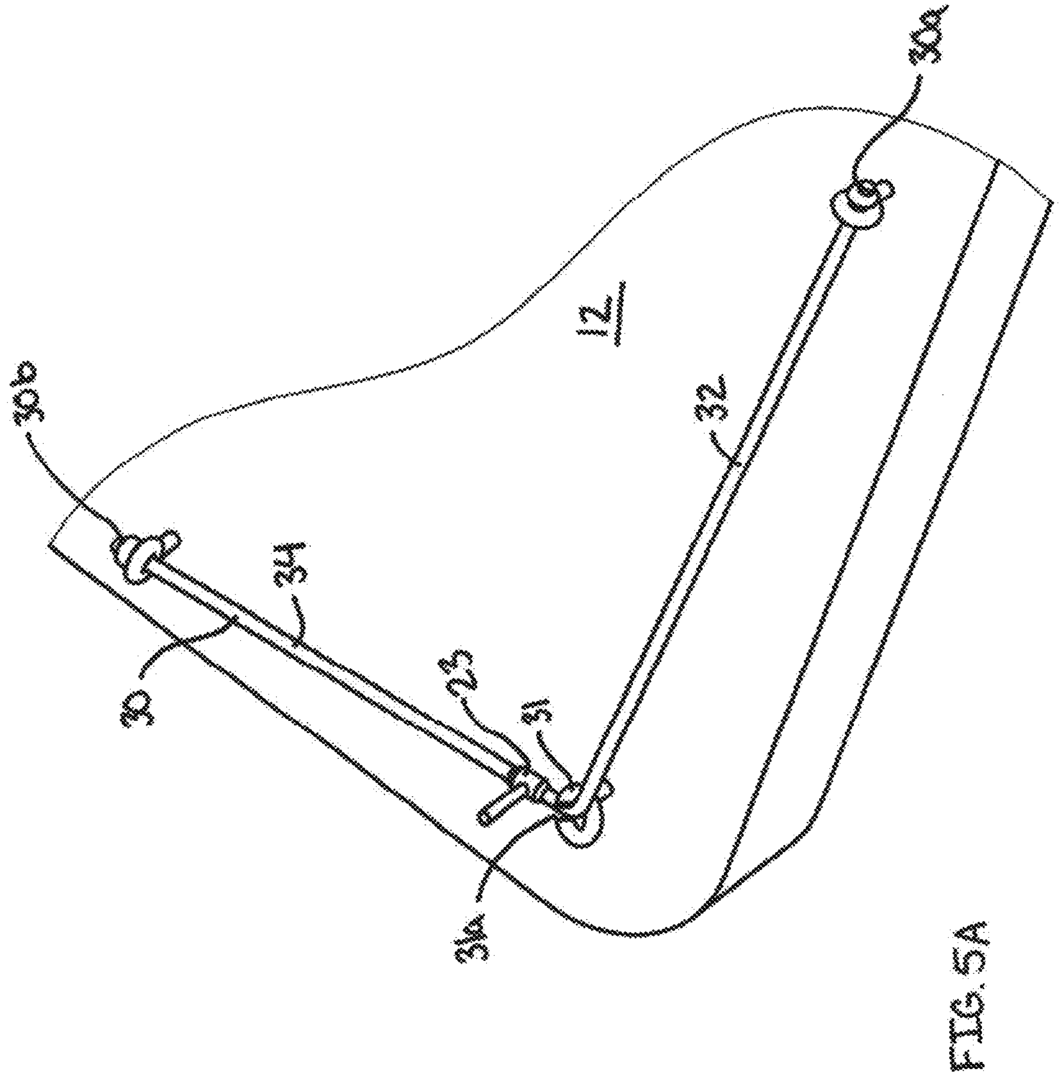
FIG. 5A is a close-up perspective view of an embodiment of a guide of the carrying case.

In other embodiments, such as illustrated in FIG. 5A, guide 30 may not be a rigid or semi-rigid member. Rather, the guide 30 may be a flexible member, such as a rope or a strap, that is supported on the rear panel 12 of the case. For example, not intended to the limiting, the first and second ends 30*a*, 30*b* of the flexible member 30 may be secured to the rear panel 12, and a support member 31 may support the flexible member 30 so as to hold the flexible member 30 in an approximate L-shape, forming first and second portions 32, 34 of the guide 30. The support member 31 may include, for example, a rigid or semi-rigid split ring 31, with a slot 31*a* for allowing a sleeve 23, which is secured to the second end 20*b* of a carrying strap 20 (not shown), to pass through the support member 31 between the first and second portions 32, 34 of the flexible guide 30.

Figure 5B:
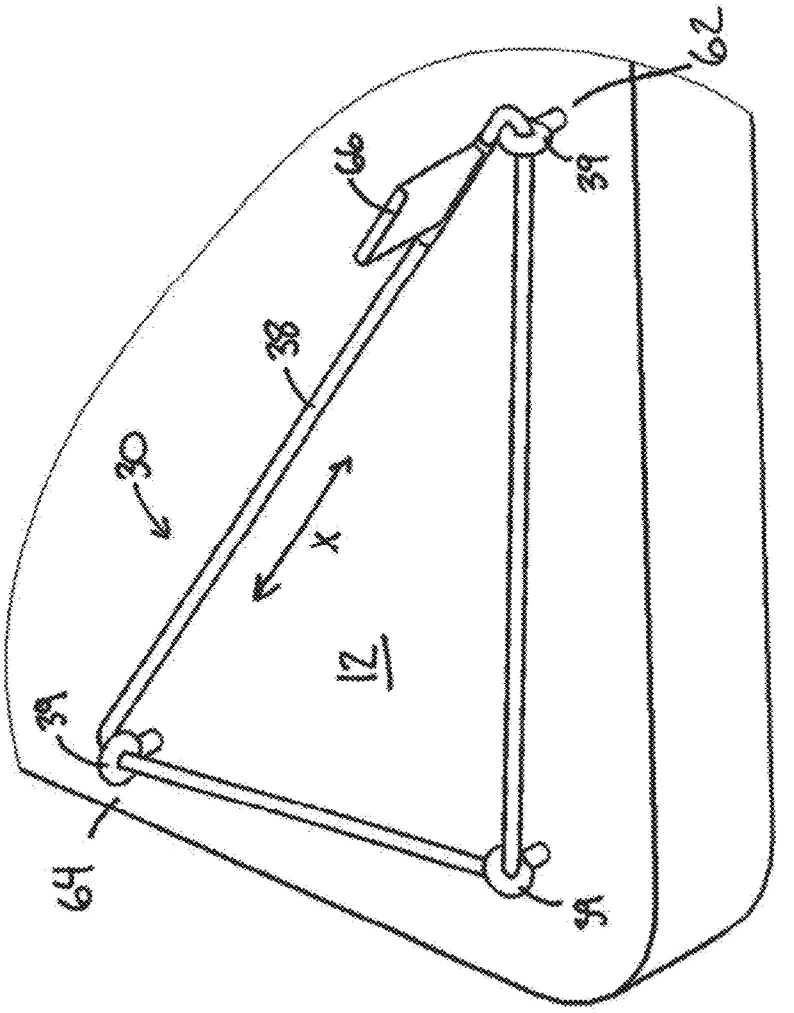
FIG. 5B is a close-up perspective view of another embodiment of a guide of the carrying case.
Figure 5C:
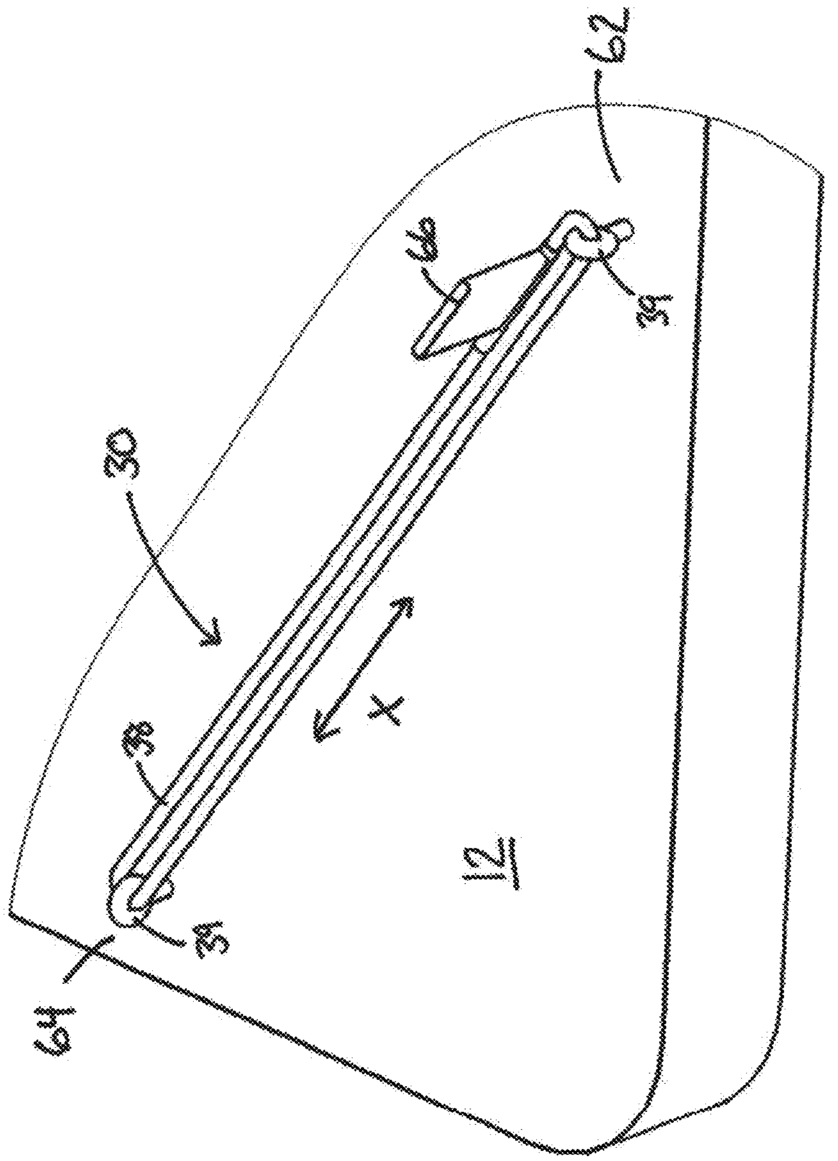
FIG. 5C is a close-up perspective view of another embodiment of a guide of the carrying case.

In other embodiments, such as illustrated in FIGS. 5B and 5C, the guide 30 comprises a loop guide member 38, the loop guide member 38 coupled to a plurality of supports 39 that are attached to the rear panel 12. As shown in FIG. 5B, the supports 39 may include, for example, a ring or another suitable rigid member, and the loop guide member is threaded through the ring or member. A fixed strap connector 66 is affixed to the loop guide member 38, with the second end 20*b* of the carrying strap attached to the fixed strap connector 66 (not shown). To move the second end 20*b* of the carrying strap, from the first position 62 to the second position 64, the fixed strap connector is moved in direction X, causing the loop guide member 38 to pass through the plurality of supports 39 as the fixed strap connector 66 moves between the first and second positions 62, 64. The embodiment shown in FIG. 5C, similarly, includes a loop guide member 38 and fixed strap connector 66 affixed to the loop guide member, but in this embodiment, the loop guide member is supported with only two supports 39, placed on the rear panel 12 at the first and second positions 62, 64 respectively. As with the embodiment shown in FIG. 5B, the second end 20*b* of the carrying strap is attached to the second end 20*b* of the carrying strap, and the fixed strap connector moves between the first and second positions 62, 64 in direction X by the fixed strap connector 66 pulling the loop guide member 38 through the supports 39, 39.

Thus, it will be appreciated that the guide member 30 may not be an L-shaped guide member, as shown for example in the embodiments illustrated in FIGS. 5B and 5C, provided that the guide member 30 allows the second end 20*b* of the carrying strap to move between the first and second positions 62, 64 on the rear panel 12 of the carrying case. Additionally, it will be appreciated that any of the different embodiments of a guide described and illustrated herein, as well as other embodiments of a guide for allowing the second end 20*b* of the carrying strap 20 to move freely between the first and second positions on the rear panel 12 of the carrying case, may have the different shapes and configurations described herein. For example, not intended to be limiting, the rigid channel guide 30 illustrated in FIGS. 4A and 4B, may have a shape other than an L-shape, such that the second end 20*b* of carrying strap 20 moves freely between the first and second positions 62, 64 on the rear panel 12.

Figure 6:
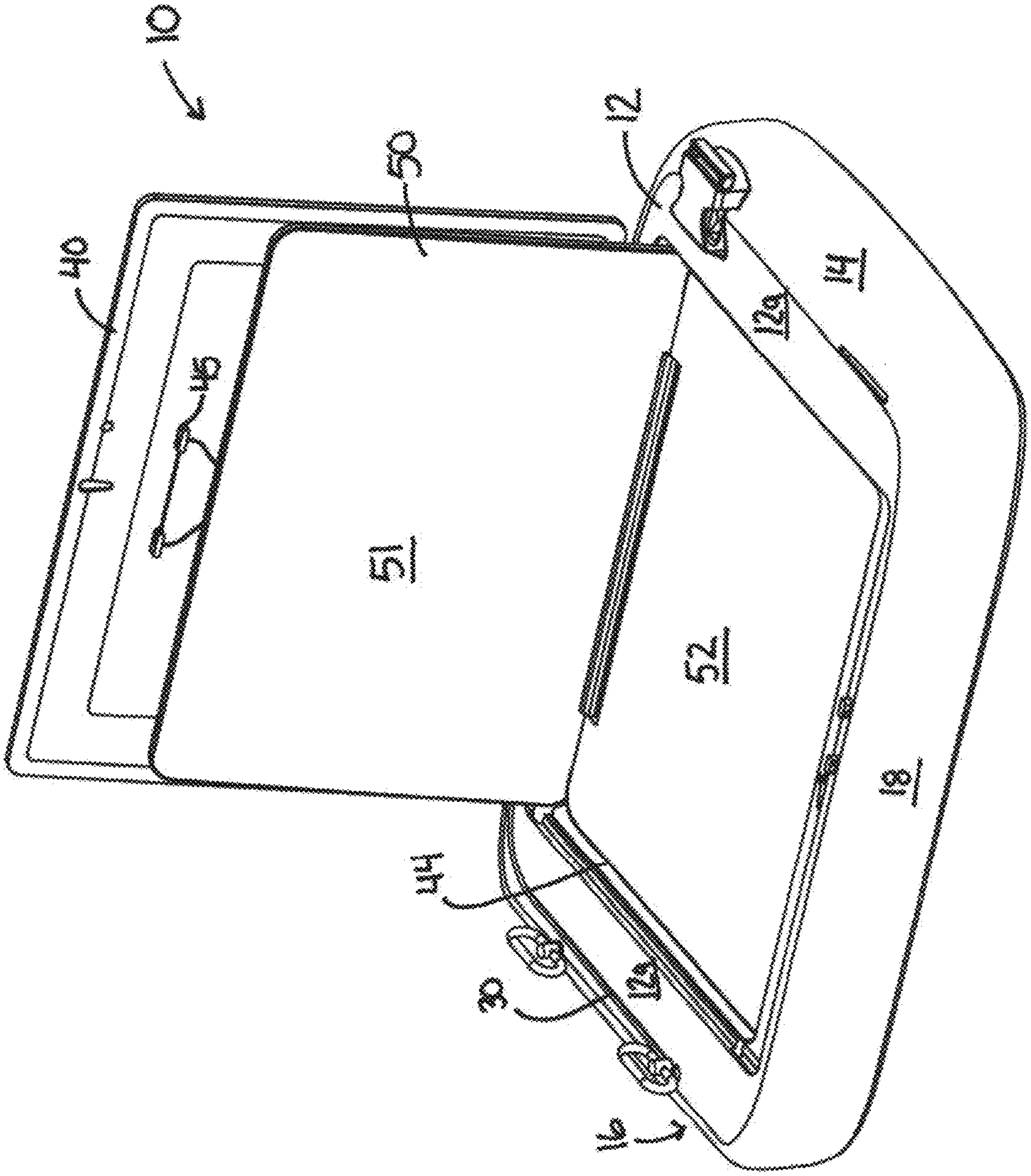
FIG. 6 is a perspective view of an embodiment of the carrying case of the present disclosure.
Figure 7:
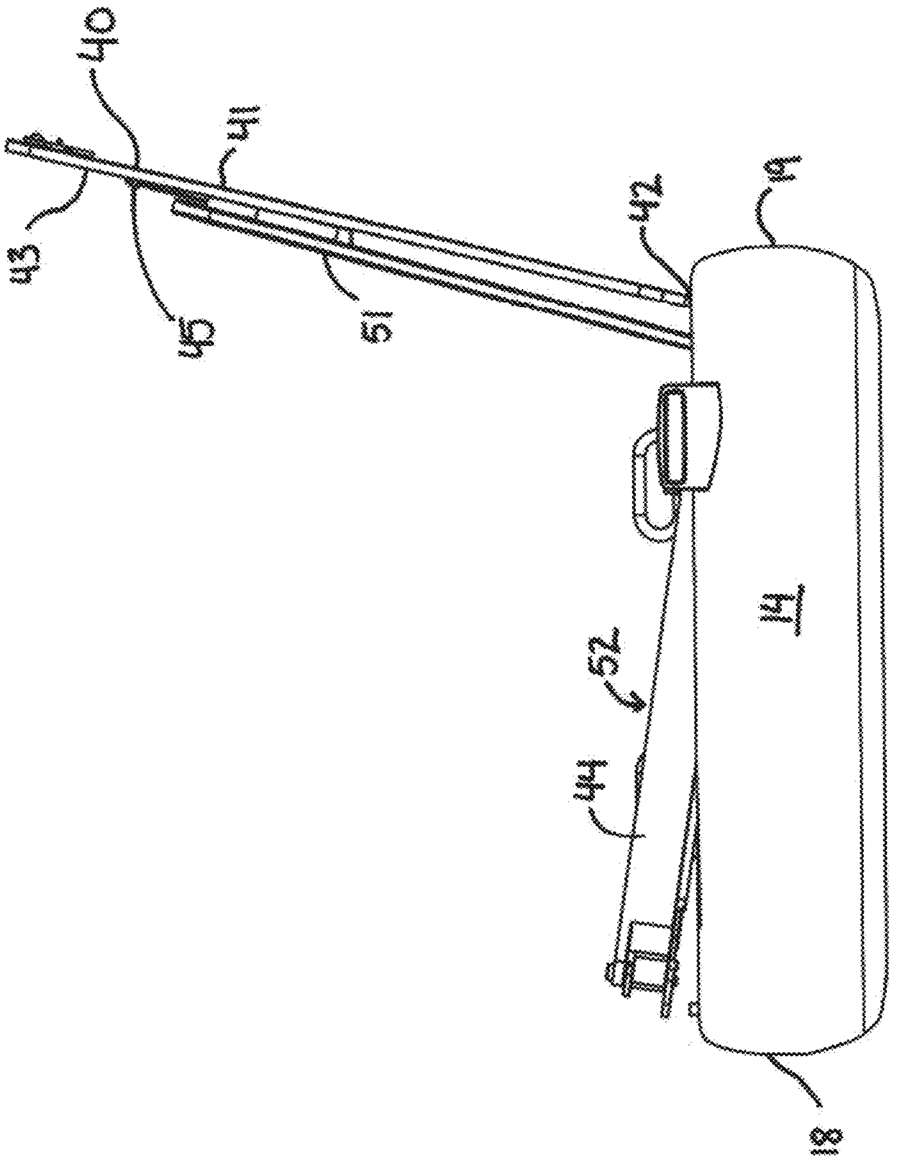
FIG. 7 is a side plan view of the embodiment of the carrying case shown in FIG. 6.

Referring to FIGS. 6 and 7, an embodiment of the carrying case 10 illustrates the screen flap 40 provided on the rear panel 12 of the laptop case 10. As best viewed in FIG. 7, the screen flap 40 is attached to the case housing by a hinge 42. The screen flap 40 opens to reveal a keyboard support 44, which is configured to hold and support the keyboard 52 of a laptop computer 50, tablet, or other electronic device. As best viewed in FIG. 6, the keyboard support 44 may be recessed within a cavity of the housing of the carrying case 10. Referring in particular to FIG. 7, the screen flap 40 includes an exterior surface 41 and an interior surface 43. The exterior surface 41 of the screen flap 40 forms a part of the rear panel 12, and may be configured to be flush with the rest of the rear panel 12 of the carrying case 10 when the screen flap 40 is in a closed position (not shown). The interior surface 43 of the screen flap 40 may be provided with a screen coupling device 45, the screen coupling device 45 configured to be releasably coupled to the screen 51 of a laptop computer 50 (or other electronic device). Thus, when the screen flap 40 is opened, the screen 51 of the laptop computer 50 is also opened.

When the carrying case 10 is in the productivity configuration, as shown for example in FIGS. 6 and 7, the side panel 18 may be supported against, or proximate to, the abdomen of the user of the carrying case. The user is thereby provided with easy access to the laptop computer 50 or other electronic device when in a standing or sitting position, with the carrying strap 20 supporting the carrying case in the productivity position, whether the user is standing or sitting while using the laptop computer 50. The rear panel 12 becomes a productivity surface in this configuration, as the laptop computer 50 may be readily accessed by opening the screen flap 42 reveal the laptop computer 50 that is stored inside the carrying case 10. The rear panel 12 of the carrying case housing may provide additional working surface 12*a*, for example, space to use a computer mouse or other computer peripheral device. The carrying case 10 may be further provided with a latch for securing the screen flap 40 in a closed position when the user wishes to store the laptop computer within the carrying case 10 (not shown). Other closures for the screen flap may include, but are not limited to, zippers. The hinge 42 of the screen flap 40 is located distally from the user when the carrying case 10 is in the productivity configuration, as shown in FIGS. 6 and 7; the carrying strap 20 has been removed from the drawings of FIGS. 6 and 7 for clarity.

Figure 8:
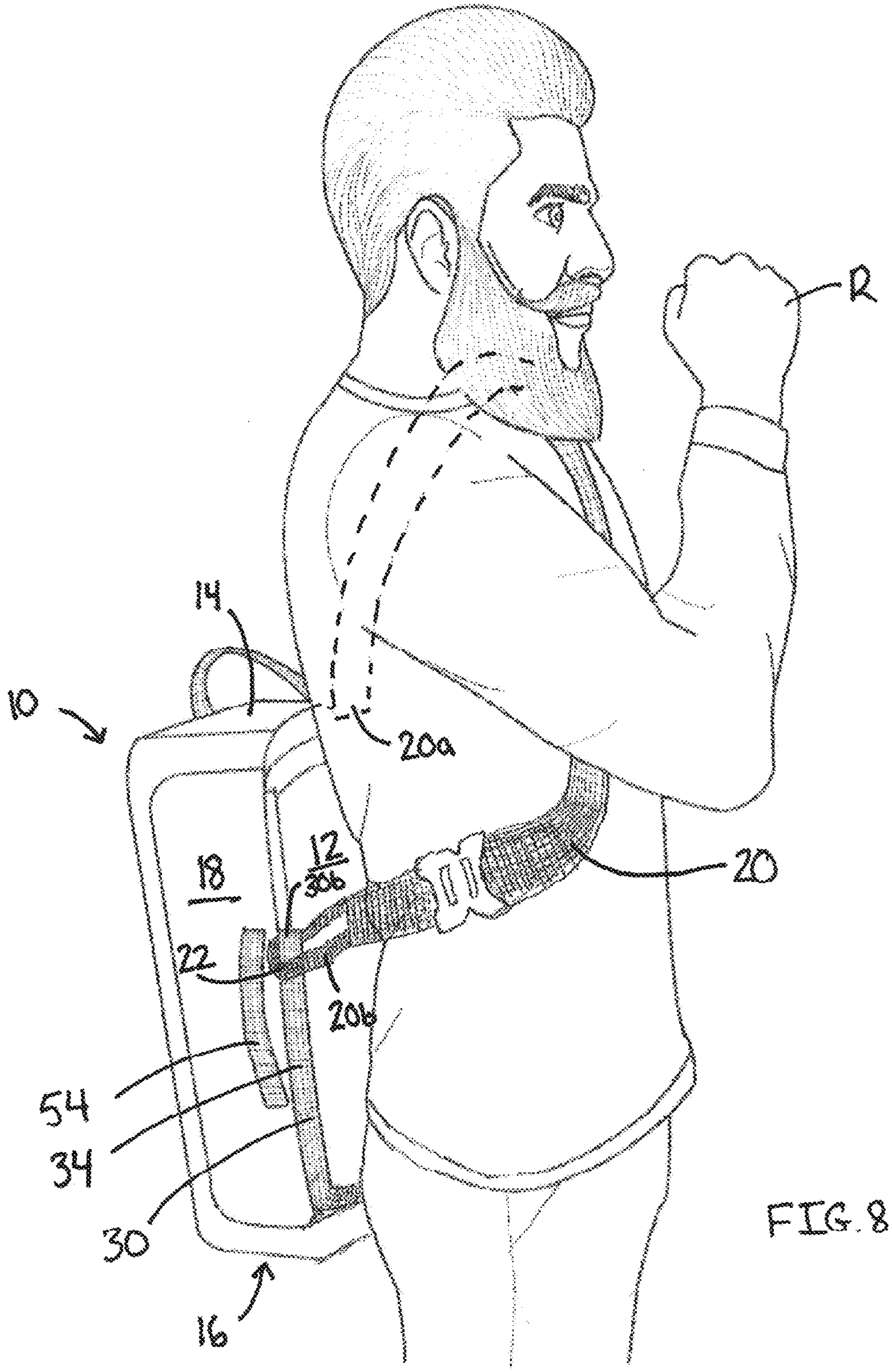
FIG. 8 is a perspective view of an embodiment of the carrying case of the present disclosure, shown worn in the rear carrying configuration on a user's back.
Figure 9:
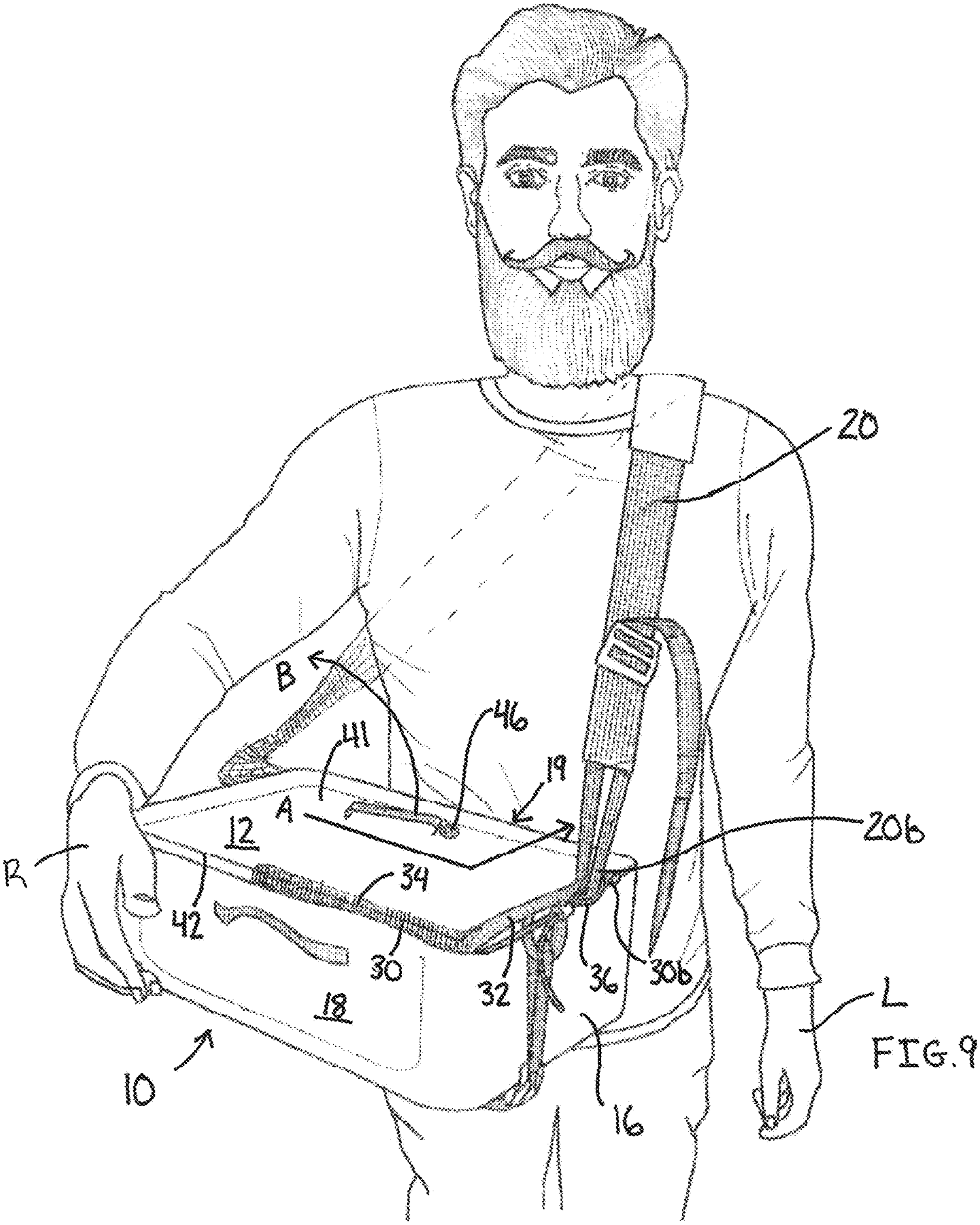
FIG. 9 is a perspective view of the embodiment of the carrying case shown in FIG. 8, illustrated as worn in the productivity configuration.

An embodiment of the carrying case is illustrated in FIGS. 8 and 9. As shown in FIG. 8, the carrying case is worn on the user's back in a rear carrying configuration. The carrying case 10 includes a rear panel 12 that is adjacent to the back of the user in this configuration. The carrying case housing includes side panel 18 that is optionally provided with a handle 54. The carrying strap 20 is worn over the shoulder of the user, and a first end 20*a* of the carrying strap 20 (as shown in dotted outline) is secured to the rear panel 12 of the carrying case and adjacent to the top panel 14. The carrying strap 20 is positioned across the chest of the user, and the second end 20*b* of the carrying strap 20 includes a loop. The loop 22 is looped around guide 30. As best viewed in FIG. 8, when in the rear carrying configuration, the carrying case 10 is positioned adjacent the back of the user and the second end 20*b* of the carrying strap 20 is positioned at the second end 30*b* of the guide 30, having travelled the length of the second portion 34 of the guide 30. Notably, the second end 20*b* of the carrying strap 20 is located adjacent the side panel 18 and spaced apart from the bottom panel 16 of the carrying case 10.

Referring still to FIGS. 8 and 9, in order to manipulate the carrying case 10 from the rear carrying configuration shown in FIG. 8 to the productivity configuration shown in FIG. 9, the user may grasp the handle 54 provided on the side panel 18 of the carrying case 10 with the user's right hand R, and pull the carrying case underneath the user's right arm until the other side panel 19 is resting against the abdomen of the user, as shown in FIG. 9. The second end 20*b* of the carrying strap 20 is freely moved along the guide 30, from the second portion 34 to the first portion 32, by travelling in direction A along the periphery of the rear panel 12 of carrying case 10. In the productivity configuration shown in FIG. 9, the screen flap 41 may be opened by releasing the latch 46 and rotating the screen flap 41 about its hinge 42 in direction B. The second end 20*b* of the carrying strap 20 is located at the second end 30*b* of the guide 30, which is a position adjacent to the bottom panel 16 of the carrying case housing 10. The position where second end 20*b* of the carrying strap 20 comes to rest, in the productivity configuration shown in FIG. 9, may be adjusted with an optional stop cord 36.

Advantageously, the keyboard of the laptop computer or other electronic device stored within the cavity of the carrying case 10 may be readily accessed by, in the illustrated embodiment, the user's right hand R, and may also be accessed by the users left hand L, depending on how the carrying strap 20 is positioned. It will be appreciated that the guide 30, having the first and second portions 32, 34, allows for better ergonomic positioning of the carrying case on the users back when in a rear carrying configuration. Furthermore, the laptop carrying case may be easily manipulated from the rear carrying position to the productivity configuration, using only one hand, for example the user's right hand, to grasp and pull the laptop case from one position to another. By positioning the second end 20*b* of the carrying strap 20 somewhere approximately mid-way between the top and bottom panels 14, 16 of the carrying case 10, the manipulation of the carrying case from one configuration to the other configuration is readily achieved by using only one hand. The feature of one-handed manipulation may be of particular utility in situations where the user is manipulating the carrying case while in a standing position, in a crowded area, or when riding on a bus or train.

It will be appreciated by a person skilled in the art that the illustrated embodiments shown in FIGS. 1 to 9 are not intended to be limiting, and that, for example, the carrying case 10 may be configured to be worn over the user's right hand shoulder and manipulated using the user's left hand, rather than being worn over the left shoulder and manipulated with the users right hand as shown in the illustrations.

It will be further appreciated that the guide 30 may be constructed in a number of different ways, so long as the second end 20*b* of the carrying strap 20 is configured to freely move along the guide 30 from a first position 62 to a second position 64 on the rear panel 12, such that the second end of the strap readily moves between a second position that is adjacent to the side panel 18, 19 and located somewhere midway between the top and bottom panels 14, 16, and a first position where the second end 20*b* of the carrying strap 20 is located adjacent to the bottom panel 16 and somewhere between the side panels 18, 19.

In some embodiments, the carrying case includes a secondary carrying strap, the secondary carrying strap attached at a first end to the rear panel of the housing adjacent the top panel, and the second end attached to the rear panel of the housing adjacent the bottom panel. Optionally, the secondary strap may be worn on one shoulder and the carrying strap may be worn on the other shoulder of the user, so as to carry the carrying case in a rear carrying configuration that is similar to a backpack having two shoulder straps. The secondary strap may be removable, such as by coupling the secondary strap to the carrying case using a pair of buckles or other coupling devices, and/or the secondary strap may be stowed within, or carried on, the carrying case when not in use.

In some embodiments, the carrying case may include one or more ports extending through the housing and into the cavity of the housing. The one or more ports may be used to attach power cords, data cords, USB cords for peripheral devices, ethernet cables, and the like, to a laptop computer or other electronic device that is stored within the cavity of the carrying case. Such ports may be useful, for example, when it is desired to insert a cord into the laptop computer or other electronic device while the electronic device is stored, or held within, a cavity of the housing, such as when the carrying case is being used in the productivity configuration. This may allow a user to charge the electronic device, or use a mouse or other peripheral device, without having to remove the electronic device from the carrying case.

What is claimed is:

1. A convertible carrying case for carrying a computing device, comprising:

a housing comprising a front panel, a rear panel, a top panel, a bottom panel and two side panels extending between the front and rear panels;

a carrying strap having first and second ends, wherein the first end of the carrying strap is attached to the housing adjacent the top panel and the second end is movably coupled to a guide, the guide attached to the rear panel and comprising first and second ends and a body extending therebetween, the first end of the guide located adjacent the bottom panel and spaced apart from the two side panels, and the second end of the guide located adjacent to one of the two side panels and spaced apart from the bottom panel;

wherein the second end of the carrying strap moves freely along the body of the guide between the first and second ends of the guide when a user is manipulating the carrying case into different configurations; and wherein, when the carrying case is in a rear carrying configuration, the second end of the carrying strap is positioned at the second end of the guide, adjacent to one of the two side panels and spaced apart from the bottom panel to provide an ergonomic rear carrying configuration by lowering a center of gravity of the carrying case relative to a center of gravity of the user of the carrying case; and wherein, when the carrying case is in a productivity configuration, the second end of the carrying strap is positioned at the first end of the guide, adjacent to the bottom panel and spaced apart from the two side panels, and one of the two side panels is resting against or proximate to the user so as to configure the rear panel as a working surface.

2. The convertible carrying case of claim 1, wherein the guide is an L-shaped guide, the body of the L-shaped guide having a first portion extending along the rear panel and adjacent to the bottom panel and a second portion extending along the rear panel and adjacent to one of the two side panels.

3. The convertible carrying case of claim 2, wherein the L-shaped guide is a rigid rod and wherein the second end of the carrying strap includes a closed loop that encircles, so as to slide along, the rigid rod.

4. The convertible carrying case of claim 2, wherein the L-shaped guide is a rigid channel and wherein a ball-shaped joint or a t-shaped pin is attached to the second end of the carrying strap and retained within the rigid channel to move freely along the rigid channel.

5. The convertible carrying case of claim 4, wherein the rear panel is a rigid or semi-rigid panel having an exterior surface, and wherein the rigid channel is recessed within the rear panel beneath the exterior surface of the rear panel.

6. The convertible carrying case of claim 2, wherein an angle between the first and second portions of the guide is greater than 90° and less than or equal to 97°.

7. The convertible carrying case of claim 1, wherein the guide comprises a flexible strap and at least one support extending orthogonally from the rear panel of the carrying case, the at least one support coupled to the flexible strap proximate a junction between the bottom panel and one of the two side panels to support the flexible strap in an approximate L-shape.

8. The convertible carrying case of claim 7, wherein the at least one support is a split ring and the second end of the carrying strap is coupled to the flexible strap of the guide via a sleeve, the sleeve encircling the flexible strap so as to slide along the flexible strap and pass through a gap of the split ring as the sleeve passes between the first and second portions of the guide.

9. The convertible carrying case of claim 1, wherein when the carrying case is in the productivity configuration, the working surface includes a screen flap having a hinge, the hinge located at an edge of the working surface that is distal from and approximately parallel to the user when the convertible carrying case is worn in the productivity configuration on the user.

10. The convertible carrying case of claim 9, wherein the screen flap includes an exterior surface and an interior surface, and wherein a screen coupling is attached to the interior surface of the screen flap for releasably coupling a screen of the computing device to the screen flap.

11. The convertible carrying case of claim 9, wherein a keyboard surface is located in a cavity of the carrying case housing, the keyboard surface positioned between and approximately parallel to the front and rear panels of the carrying case housing, and wherein a keyboard of the computing device is supported on the keyboard surface and is accessible by the user when the screen flap is open and the carrying case is in the productivity configuration.

12. The convertible carrying case of claim 11 wherein at least one of the screen flap and the keyboard surface are rigid or semi-rigid.

13. The convertible carrying case of claim 1 further comprising a secondary strap, the secondary strap having a first end attached to the housing adjacent the top panel and a second end attached to the housing adjacent the bottom panel, wherein the carrying strap and the secondary strap are worn on opposite shoulders of the user when the carrying case is in the rear carrying configuration.

14. The convertible carrying case of claim 1 further comprising at least one handle, the at least one handle attached to one of the two side panels, wherein the handle is graspable by the user with one hand for manipulating the carrying case between the rear carrying and productivity configurations.

15. The convertible carrying case of claim 1 further comprising at least one port extending through the housing, the at least one port positioned to receive a connector of a cable, the cable selected from a group comprising: a power cable and a data cable.

16. The convertible carrying case of claim 1, wherein the guide comprises a flexible loop, the flexible loop slidably attached to at least two supports, the at least two supports extending orthogonally from the rear panel of the carrying case, wherein the at least two supports support the first and second ends of the guide and a fixed strap connector coupled to the second end of the carrying strap is affixed to the flexible loop; and wherein, as the flexible loop slides through the at least two supports, the fixed strap connector and the second end of the carrying strap freely move between the first and second ends of the guide.

17. The convertible carrying case of claim 16, wherein each support of the at least two supports comprises a rigid member and wherein each rigid member encircles the flexible loop.

18. The convertible carrying case of claim 16, wherein the at least two supports comprises a first support, a second support and a third support, wherein the first support extends from the rear panel at the first position, the second support extends from the rear panel at the second position, and the third support extends from the rear panel adjacent a junction between the bottom panel and one of the two side panels.

* * * * *